Aug. 2, 1960 M. FÖHR 2,947,653
METHOD OF PRODUCING CONTAINERS FROM THERMOPLASTIC MATERIAL
Filed June 26, 1956

INVENTOR.
MATTHIAS FÖHR
BY

United States Patent Office 2,947,653
Patented Aug. 2, 1960

2,947,653

METHOD OF PRODUCING CONTAINERS FROM THERMOPLASTIC MATERIAL

Matthias Föhr, Glattbrugg, Switzerland, assignor to Werkzeugmaschinenfabrik Oerlikon Buhrle & Co., Abt.: Elektrodenfabrik, Zurich-Oerlikon, Switzerland, a company of Switzerland Filed June 26, 1956, Ser. No. 593,922

Claims priority, application Switzerland May 28, 1956

4 Claims. (Cl. 154—83)

The present invention relates to a method of and apparatus for producing containers or tubes from thermoplastic material.

A number of methods of producing containers or tubes from thermoplastic materials are already known. One such method applies a process employed in the manufacture of metal and aluminum tubes, respectively, in that a prefabricated hose of thermoplastic material is hot moulded into tube shape in a suitable tool. Another method employs a finished hose of thermoplastic material placed in a die casting device which applies a suitable tube neck. A third application employs a die casting process to produce the tube from thermoplastic material.

Apart from the fact that the aforementioned processes have proved to be substantially more complex and/or costly than those employed for the production of aluminium tubes, they utilize relatively thick-walled plastic hose as a base material for the tube container proper so that the end portion, i.e. the shoulder and tube neck, may be satisfactorily die cast to, or formed from, the pipe, or the die casting cannot be performed with a minimum wall thickness such as would suffice for the tube body.

Accordingly, the material cost of such a plastic tube is higher than that of an aluminium tube although aluminium is more costly than plastic material. The cost price of the finished plastic tube is considerably higher than that of an aluminium tube not only because of the more expensive manufacturing process involved but also due to the relatively large quantity of material required.

As tubes formed of plastics display an important advantage over those made of aluminium, i.e. substantially greater resistance to chemicals, the present invention has for its object the provision of a manufacturing method according to which the cost price of plastic tubes can be reduced, consumption of material being smaller and the actual process simplified.

The method according to the present invention is characterized in that a strip-type plastic sheet has a hollow substantially cylindrical extension added thereto by permanent deformation, effected by means of a mandrel in which extension is inserted a length of tube also formed of plastic and welded to the front wall of the extension in order to provide a reinforced tube neck. Thus by folding the strip in the vicinity of the extension, two overlapping wall portions are formed which have the areas along their edges welded together.

It is a further object of this invention to provide a simple economic device for the performance of the method characterized in that the top of an air-permeable plate has arranged thereon a plurality of spaced pins substantially normal thereto, thereafter means are provided to produce a pressure differential between the surface and the under face of the said plate for the purpose of forcing a sheet of thermoplastic material covering the base and the pins against the former, and of forming a number of tube necks corresponding to that of the pins by means of permanent deformation.

The plastic tube produced according to the method of the present invention is characterized in that the tube neck formed by plastic deformation from a plastic sheet comprises a plastic sleeve which has at least its outer end welded to the tube neck, and that the container is formed by two sheet portions superimposed by folding, which have their edges welded together, both container and tube neck being formed by a single sheet.

A number of embodiments of the plastic tube and an embodiment of the device, by means of which the method according to this invention will be explained by way of example, are shown in the drawing, in which Fig. 1 is a perspective view of a folded strip formed of plastic sheet on which is formed a tube neck;

Figure 1:
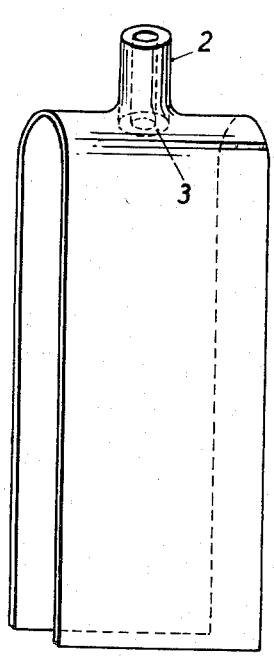
Figure 2:
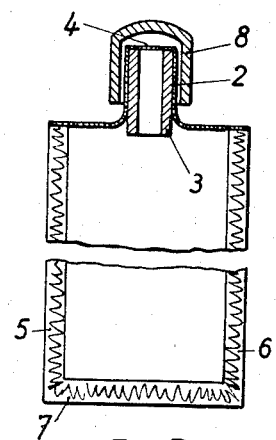
Fig. 2 is a sectional view of the top portion of a finished tube with a reinforced neck.

As shown in Figs. 1 and 2 the plastic tube is produced by forming a tube neck 2 on a strip-type plastic sheet 1. The tube neck is produced by pulling the sheet 1 over a mandrel (not shown) so that a cylindrical projection is formed on the sheet by plastic deformation, the diameter of the said projection corresponding to that of the mandrel. By way of example, with a sheet thickness of .1 mm. and a mandrel diameter of 5 mm. a neck of 10–30 mm. length, which is closed at its upper end, can be formed. The neck 2 has inserted therein a length of tube 3 so adapted to the inner neck diameter that it is tightly enclosed. The closed front face of the tube neck 2, which forms a closing membrane 4, is heated and forced against the corresponding end face of the length of tube 3 so that the two members are joined and the length of tube anchored in the position shown in Fig. 1. The length of tube 3 somewhat exceeds that of the tube neck.

When the length of tube 3 is secured in the tube neck 2, the sheet is folded in the neck area in such a manner that the sheet portions extending on either side of the neck overlap, and the two portions then have their edges connected by welding seams 5, 6 and 7 (Fig. 2). The tube may be filled either through its lower end prior to making the welding seam 7 or, if the latter is made, by opening the tube neck, i.e. perforating the membrane 4, and injecting through the tube neck.

Fig. 2 further shows that the tube may be closed by a closing cap 8 which sits tightly on the tube neck. Since both the closure cap and the tube neck can adapt themselves to one another, a tight closure of the tube can be produced in this manner, which will remain tight even after the cap has been removed several times.

Figure 3:
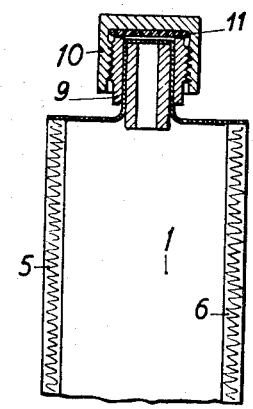
Fig. 3 is a sectional view of another embodiment with a screw-on cap.

In the embodiment of the tube shown in Fig. 3 a threaded bushing 9 is forced on the tube neck 2 reinforced by a length of tube 3. A screw-on cap 10 is screwed on the bushing 9 so that the tube can be opened and closed as usual. A sealing washer 11 may be inserted between the top end face of the threaded bush 9 and the screw-on cap 10. In this embodiment, too, the membrane may be left intact until the tube is used for the first time.

Naturally it is also possible to replace the threaded bushing 9 by an exterior reinforcing sleeve and to close the tube by a closure cap 8 in a manner corresponding to that disclosed in Fig. 2, the closure cap being simply slipped on the reinforcing sleeve to form a tight seal.

Figure 4:
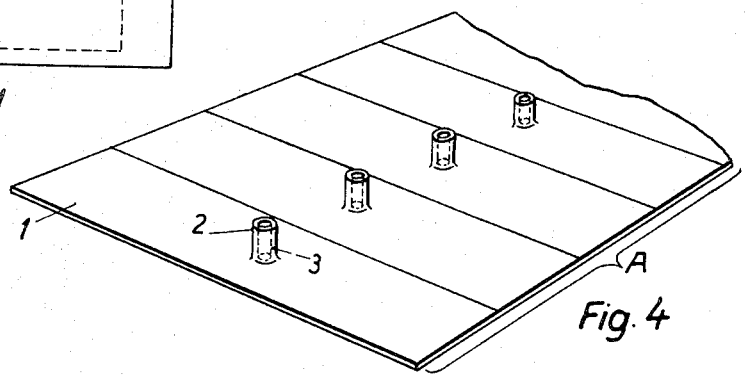
Fig. 4 illustrates a strip of sheet on which a plurality of tube necks has been formed simultaneously.

Fig. 4 shows a method of producing the tubes according to which the tube necks 2 are simultaneously formed on a plurality of sheets 1. The sheets 1 form strips of a long web of thermoplastic material and are separated only after producing the tube necks 2 by plastic deformation.

Figure 5:
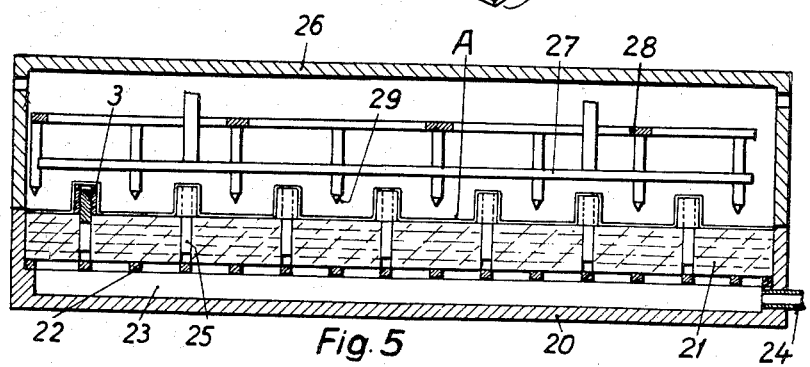
Fig. 5 is a longitudinal sectional view of the device.

Fig. 5 shows a device enabling a web of the type shown in Fig. 4 to be provided with tube necks already equipped with reinforcing tubes 3, and to cut the web to form the individual sheets 1.

The device according to Fig. 5 comprises a base portion of a housing 20 open at the top in which a plate 21 formed of porous air-permeable material is supported on a lattice 22 which is in turn attached to the base portion of the housing. Between the bottom of the base portion of the said housing and the plate 21 is a chamber 23 which is connected, via a tube 24, with a vacuum pump (not shown) or a suction blower provided to evacuate the chamber 23.

At regular intervals pins 25 are arranged on the plate 21, which extend normally to the plate and extend from its surface by a certain length. Tubes 3 are loosely slipped over the pins 25 and supported by the plate 21.

The base portion of the housing 20 is covered by a top portion 26 which comprises a heating rod 27 and a cutting device 28 having cutters 29, which extend transversely to the longitudinal axis of the device intermediately of each pair of pins 25. Both the heating rod 27 and the cutting device 28 are vertically displaceable within the top portion of the housing 26 by means operable from the outside (not shown).

In operation a web A of thermoplastic material is inserted between the base portion 20 and the top portion 26 of the housing, which fully covers the plate 21, while the lengths of tubes 3 have previously been slipped over the pins 25. The vacuum pump connected to tube 24 is started so that air is withdrawn from the chamber 23 and, owing to the permeability of plate 21, from between the plate and web A, so that a negative pressure is produced at the underface of web A. This web is consequently forced against the plate, also in the immediate vicinity of the pins 25 and the tubes 3 respectively, so that the web is plastically deformed and has its tube necks 2 formed around the tubes 3. Subsequently, the heating rod 27 which is equipped with heating elements (not shown) is lowered until the heating elements engage the top faces of the tubes 3 or the web portions covering the said tubes so that the said portions are welded to the tubes. The rod is then raised again. The cutting device 28 is next lowered and the web A subdivided into a plurality of strip-type sheets 1 by means of the cutters 29.

After removal of the top portion of the housing, the sheets may be removed, folded in the manner disclosed and welded along their edges so as to produce the finished tubes.

Instead of being simply placed on the plate 21, the said sheet or web may be clamped in a tentering frame in application of the so-called vacuum deforming process, which frame is then tightly inserted in the housing above plate 21. Prior to deformation, the sheet may be heated by radiation generated by a suitable heating device arranged above the sheet.

Again, instead of employing the vacuum deforming process, pressure or pressure and vacuum may be employed to effect deformation. The base plate with the plastic tube lengths loosely slipped over the mandrels at predetermined distances may be moved, by a lifting device, against the plastic sheet in a closed system so that the sheet is deformed while hot. Such deformation is effected by vacuum and/or pressure, and will produce the same results.

As stated above, the lower end of the tube may also be left open in order to form an opening for filling. After filling, this opening is closed by an inserted plate or disc which may, by way of example, be cylindrical and which is welded to the sheet.

The closure cap shown in Fig. 2 may also be formed by a short length of tube having one end closed by welding.

Having now particularly described and ascertained the nature of my said invention and in what manner the same is to be performed, I declare that what I claim is:

1. A method of producing a container from thermoplastic material comprising the steps of permanently deforming a plastic web by means of a mandrel to form a hollow substantially cylindrical extension in the middle of said web, inserting a length of tube also formed of plastic material in said extension, welding said length of tube to the end face of said extension in order to form a reinforced tube neck and a closure seal, and then bringing together and welding the two overlapping wall portions formed by folding the web in the vicinity of the extension to form seams closing said container.

2. A method according to claim 1, characterized by the fact that a bushing formed of thermoplastic material is slipped over and welded to said tube neck.

3. A method according to claim 1, characterized by the fact that a plurality of tube necks are formed simultaneously on a web of thermoplastic material and the web is then subdivided into strip-type sheets.

4. A method according to claim 3, characterized by the fact that all of said tube necks on said web are simultaneously formed under vacuum pressure by deforming the web around said reinforcing lengths of tube of thermoplastic material, welding said lengths of tube to said tube necks, and cutting the web into strips of which each comprises one tube neck with a reinforcing tube length.

References Cited in the file of this patent

UNITED STATES PATENTS

| 777,744 | Paul | Dec. 20, 1904 |
| 801,227 | Drummond | Oct. 10, 1905 |
| 1,263,141 | Strauss | Apr. 16, 1918 |
| 1,310,439 | Roberts | July 22, 1919 |
| 1,553,554 | Roberts | Sept. 13, 1925 |
| 1,716,547 | Geake | June 11, 1929 |
| 1,972,087 | Burke | Sept. 4, 1934 |
| 2,500,639 | Lermer | Mar. 14, 1950 |
| 2,661,741 | Puckman | Dec. 8, 1953 |
| 2,671,577 | Remington et al. | Mar. 9, 1954 |
| 2,702,146 | Land | Feb. 15, 1955 |

FOREIGN PATENTS

| 561,225 | Great Britain | May 10, 1944 |